(12) United States Patent
Chang et al.

(10) Patent No.: US 7,788,539 B2
(45) Date of Patent: Aug. 31, 2010

(54) METHOD AND SYSTEM TO DEBUG A COMMAND

(75) Inventors: Belinda Chang, Cary, NC (US); John Raithel Hind, Raleigh, NC (US); Robert Edward Moore, Durham, NC (US); Brad Byer Topol, Cary, NC (US); Jie Xing, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 11/456,905

(22) Filed: Jul. 12, 2006

(65) Prior Publication Data

US 2008/0126324 A1 May 29, 2008

(51) Int. Cl.
*G06F 11/00* (2006.01)
(52) U.S. Cl. .......................................... 714/38; 717/124
(58) Field of Classification Search ................... 714/38; 717/124, 125, 143
See application file for complete search history.

(56) References Cited

U.S. PATENT DOCUMENTS

| | | | | |
|---|---|---|---|---|
| 5,255,386 | A | * | 10/1993 | Prager ........................... 707/5 |
| 5,854,925 | A | * | 12/1998 | Shimomura ................. 717/128 |
| 6,581,050 | B1 | * | 6/2003 | Horvitz et al. ................. 706/45 |
| 7,013,457 | B2 | * | 3/2006 | Chiang et al. ................ 717/131 |
| 2005/0229045 | A1 | * | 10/2005 | Tamakoshi .................... 714/38 |
| 2005/0246158 | A1 | * | 11/2005 | Weise ............................ 704/4 |

OTHER PUBLICATIONS

Martins, Bruno and Silva, Mario J., "Spelling Correction for Search Engine Queries", Department of Informatica, Lisboa, Portugal.
Cucerzan, Silviu and Brill, Eric, "Spelling Correction as an Iterative Process that Exploits the Collective Knowledge of Web Users", MIcrosoft Research, Redmond, WA.
"Spelling Correction", http://wwwhephy.oeaw.ac.at/p3w/system/tcsh/Spelling_correction.html, Oct. 30, 2006.
"How to Use the AutoComplete Feature in Internet Explorer 5 and 6", http://support.microsoft.com/default.aspx?scid=kb;EN-US;217148. Oct. 30, 2006, pp. 1-3.
"Using IntelliSense", http://msdn.microsoft.com/library/en-us/vsintro7/html/vcovrAutomaticStatementCompletion.asp, Oct. 30, 2006.
"PROMPTAPAL—A Command Prompt For the XP Age", http://www.promptpal.com/product_info.shtml, Oct. 30, 2006 pp. 1-4.

* cited by examiner

*Primary Examiner*—Yolanda L Wilson
(74) *Attorney, Agent, or Firm*—Charles L. Moore; Moore & Van Allen, PLLC

(57) ABSTRACT

A method to debug a user command that failed to execute on a computing device may include forming a syntactically valid built-up command. The method may also include comparing the user command to the built-up command and analyzing the user command holistically.

16 Claims, 3 Drawing Sheets

METHOD AND SYSTEM TO DEBUG A COMMAND

BACKGROUND OF THE INVENTION

The present invention relates to controlling operation of a computing device or like by providing commands, and more particularly to a method and system to debug a command that fails to execute.

A very frustrating situation for computer users occurs when the user enters a command that does not work, yet the user cannot see anything wrong with the command. Often times the error may be something simple, such as a typo, missing argument, misspelling and the like that may be easily detected by another person looking at the command, i.e., a "second pair of eyes." Command syntaxes, however, are numerous and can be quite involved. Detecting such errors can be quite challenging and at times may involve detailed knowledge.

BRIEF SUMMARY OF THE INVENTION

In accordance with an embodiment of the present invention, a method to debug a user command that failed to execute on a computing device may include forming a syntactically valid built-up command. The method may also include comparing the user command to the built-up command and analyzing the user command holistically.

In accordance with another embodiment of the present invention, a method to debug a user command that failed to execute on a computing device may include invoking an interactive dialogue to assist with debugging the user command. The method may also include forming a syntactically valid built-up command from responses to the interactive dialogue. The method may further include comparing the user command to the built-up command.

In accordance with another embodiment of the present invention, a system to debug a user command that failed to execute on a computing device may include a processor and a command debugging application operable on the processor. The command debugging application may include a module to form a syntactically valid built-up command, a module to compare the user command to the built-up command, and a module to analyze the user command holistically.

In accordance with another embodiment of the present invention, a computer program product to debug a user command that failed to execute on a computing device may include a computer usable medium having computer usable program code embodied therein. The computer usable medium may include computer usable program code configured to form a syntactically valid built-up command. The computer usable medium may also include computer usable program code configured to compare the user command to the built-up command. The computer usable medium may also include computer usable program code configured to analyze the user command holistically.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
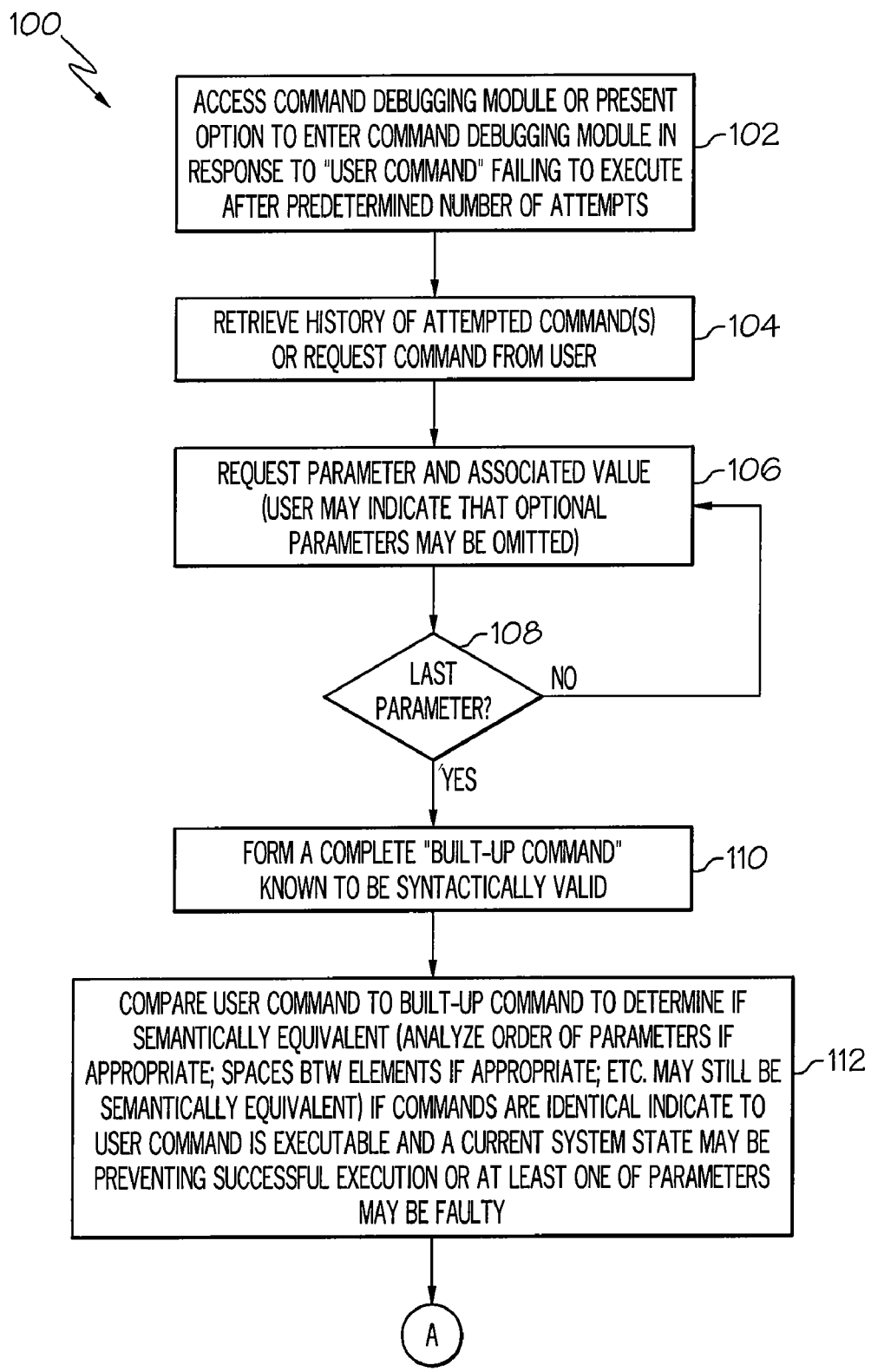
FIGS. 1A and 1B (collectively FIG. 1) are flow chart of an exemplary method to debug a user command that failed to execute on a computing device in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1B:
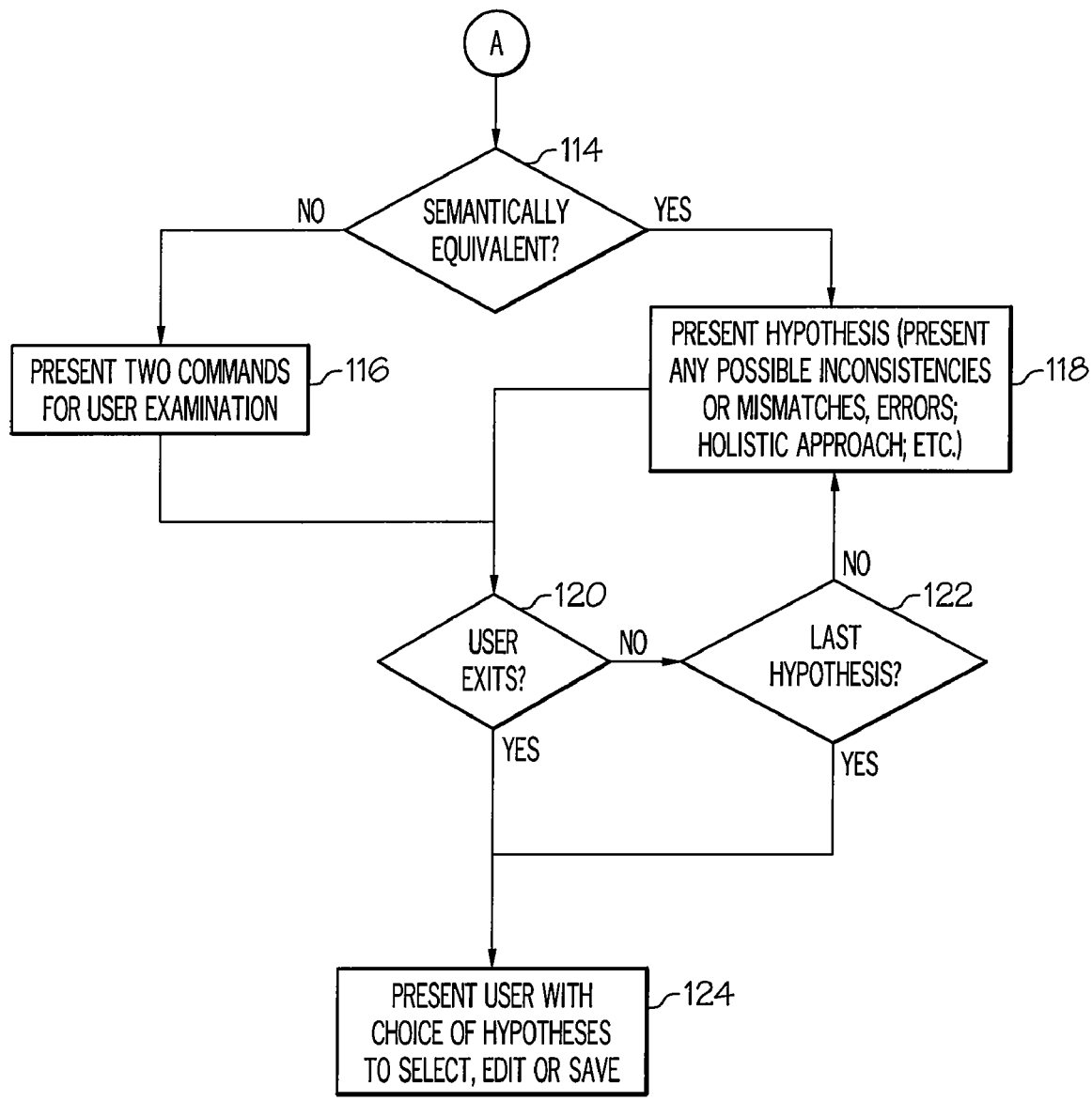

FIGS. 1A and 1B (collectively FIG. 1) are flow chart of an exemplary method 100 to debug a user command that failed to execute on a computing device or the like in accordance with an embodiment of the present invention. In block 102, a command debugging application or module may be accessed by a user or an option may be presented to the user to enter the command debugging application in response to a user entered command or user command failing to execute or failing to execute after a predetermined number of attempts. Accordingly, when a user is unable to determine why a command in not working the command debugging application may be accessed. As described in more detail, the command debugging application may involve invoking an interactive dialogue adapted to assist with debugging the user command.

In block 104, a history of attempted commands may be retrieved or a request may be presented for the user to provide a copy of the command. Alternatively, the failed command or last failed command may be automatically retrieved. In block 106, a parameter and associated parameter value may be requested. The method 100 may provide for the user to indicate that a parameter should be omitted if the parameter is an optional parameter.

In block 108, a determination may be made if the parameter entered in response to the parameter request in block 106 is the last parameter. If not the last parameter, the method 100 may return to block 106 and the user may be requested to enter another parameter and associated value. If the parameter and associated value entered in block 106 is determined to be the last parameter in block 108, the method 100 may advance to block 110. Accordingly, based on knowledge of the command syntax, the user may be asked one by one for each of the command's parameters and associated values in the interactive dialogue.

In block 110, a complete "built-up command" that is known to be syntactically valid may be formed or constructed using the parameter and parameter values provided by the user.

In block 112, the user command may be compared to the built-up command to determine if they are semantically equivalent. If the two commands are identical, an indication may be provided to the user that the problem does not lie with the overall structure of the user command. An indication may also be provided that at least one of the current system states may be preventing successful execution of the user command or at least one of the parameter values may be faulty.

Even if the user's command and the built-up command are not identical when compared as strings, they may be identifiable as semantically equivalent based on knowledge of the command's semantics. If, for example, the order of a command's parameters is known not to matter, then the following two commands are semantically equivalent (for this example, a known command-line syntax in which a parameter is identified by a hyphen appended to the front of the parameter name is used:

```
CommandName -P1 <value-1> -P2 <value2>
CommandName -P2 <value-2> -P1 <value1>
```

Similarly, if spaces between command-line elements are not significant, the following two commands can be seen as being semantically equivalent:

```
CommandName -P1 <value-1> -P2 <value2>
CommandName -P1      <value-1>       -P2 <value2>
```

In block 114, a determination may be whether the user command and the built-up command are semantically equivalent based on the comparison and analysis in block 112. If the determination in block 114 is that the two commands are not identical or semantically equivalent, the method 100 may advance to block 116. In block 116, the user command and the built-up command may be presented to the user for visual comparison by the user to detect any errors or inaccuracies in the user command. Hard-to-spot errors in the user command may become apparent with the two commands being presented together. Errors such as missing parameters, parameters in wrong order, too many, too few or mismatched parentheses for groupings of parameters, missing quotes around a parameter or other errors may become apparent when contrasted with the syntactically valid built-up command. The method 100 may then advance to block 120 and the user may elect to exit the process or method 100.

If the determination in block 114 is that the user command and built-up command are semantically equivalent, the method 100 may advance to block 118. In block 118, a hypothesis of a possible correction or corrections to the user command may be presented to the user. Any possible inconsistencies, mismatches, errors or other possible formulations for the command may be presented to the user. The hypotheses may be formulated using the parameter information supplied by the user in blocks 106 and 108, together with detailed knowledge of the command's syntax and semantics.

The method 100 may then advance to block 120 where the user has the option to exit the method 100. If the user does not elect to exit the method 100 in block 120, a determination may be made in block 122 if the current hypothesis being presented is the last hypothesis. If not, the method 100 may return to block 118 and another hypothesis may be presented for consideration by the user. New hypotheses may be added to the process at later times, as in an Artificial Intelligence system, as new user errors are discovered. New hypotheses may be added manually or as a manual process or the method 100 may be adapted to automatically add new hypotheses.

If the user elects to exit the method in block 120 or the hypothesis being presented is the last hypothesis in block 122, the method 100 may advance to block 124. In block 124, the user may be presented a choice of hypotheses to select, edit, save or perform some other operation.

As an example of the preceding hypothesis presentation operations of method 100, analysis of a user's command does not need to be restricted to a mode of one parameter at a time. Each hypothesis may be presented as a complete command with something small changed. For example, assuming a fictional command FictCom that may let a user indicate a priority for an operation in either of two ways: (1) via a Pri parameter that accepts the values (Low, Medium, High) or (2) via a PriNum parameter that supports values (1, 2, 3). If the user's command is:

FictCom -PriNum High

The automated process or method 100 may be a holistic in nature. For example, the method 100 could advise the user not only that the parameter PriNum requires a numeric value, but also that the value High applies to the parameter Pri. The method 100 may provide both pieces of information in block 118 to increase chances that the user may realize the differences between the intended command and the actual command that will be executable. The differences may be highlighted or otherwise identified when presented to the user to draw the user's attention to the differences between the user's command and the commands being offered as possibilities or hypotheses for what the user intended to enter. As an example the differences are illustrated below by bold italics and striking through the incorrect parameter value:

| | | | |
|---|---|---|---|
| FictCom | *-Pri* High | | |
| FictCom | -PriNum | *3* | ~~High~~ |

Similarly, if a command FictCom2 accepts a target specification either via a Target parameter that identifies a location in a local file system, or via a TargetUrl parameter that identifies a remote location, and if the user's command is:

FictCom2 -TargetUrl "c:\My Files\test1.out"

The automated process or method 100 could advise the user not only that the TargetUrl parameter requires a URL as its value, but also that the user's value "c:\My Files\test1.out" looks like it might have been intended for the Target parameter:

FictCom2 *-Target* "c:\My Files\test1.out"
FictCom2 -TargetUrl *"http://localhost/test1out"* ~~"c:\My Files\test1.out"~~

Accordingly, when the user's command contains a parameter/value mismatch, the user may be presented at least two possible explanations for the mismatch: correct parameter/wrong value, or wrong parameter/right value. This may be accomplished assuming command knowledge that includes regular expressions that specify the expected values for each of the command's parameters.

As previously described, if the user sees a hypothesis that represents the command they intended to enter, the user may stop the process in block 120 and save the correct command for later use in block 124. The user also has the option of editing a hypothesis before saving it in the event the hypothesis is closer to the command intended, but still not quite right. If all hypotheses have been presented in block 122, the user may be given one last chance in block 124 to select, edit and save any of the hypotheses they have previously been shown. An earlier hypothesis may seem better or closer to what the user had intended after viewing all of the hypotheses.

Figure 2:
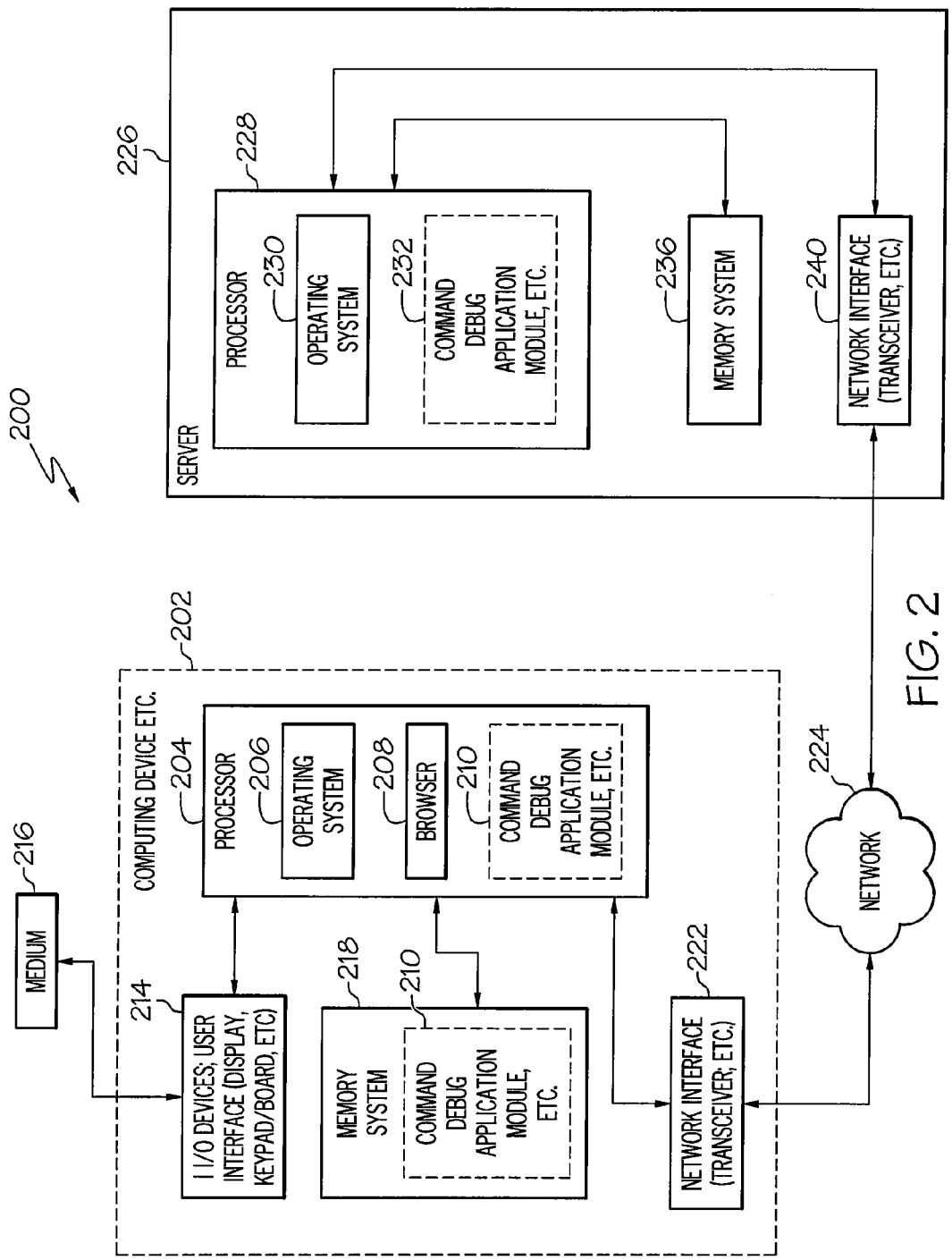
FIG. 2 is a diagram of an example of a system to debug a user command that failed to execute on a computing device in accordance with an embodiment of the present invention.

FIG. 2 is a diagram of an example of a system 200 to debug a user command that failed to execute on a computing device 202 or like in accordance with an embodiment of the present invention. FIG. 2 is a block schematic diagram of an exemplary system 200 and a computing device 202 or the like to debug a command entered by a user in accordance with an embodiment of the present invention. The computing device 202 may be a computer system, mobile computing system, communications device, personal digital assistant, cellular telephone or the like. The method 100 of FIG. 1 may be embodied in the system 200 or computing device 202.

The computing device 202 may include a processor 204. An operating system 206 may run on the processor 204 to control overall operation of the computing device 202. The computing device 202 may also include a browser 208 for accessing web sites or the like on a network, such as the Internet, a private network or other type of network. The computing device 202 may also include a command debug application 210, module or the like that may be operable on the processor 204. The method 100 may be embodied in the command debug application 210.

The computing device 202 may also include an input/output (I/O) device or devices and a user interface 214. The user interface 214 may include a display or monitor, keypad, keyboard or the like for a user to enter data and perform the functions described with respect to method 100. The I/O device or devices 214 may include disk drives or the like to download data from a computer useable or readable medium 216 as defined herein.

The computing device 202 may also include a memory system 218. The command debug application 210' may be stored on the memory system and uploaded to the processor for operation when needed or accessed.

The computing device 202 may also include a network interface 222 for accessing a network 224. The network interface 222 may be or may include a wireless transceiver for communicating with the network 224 via radio signals. The network 224 may be a wireless communications network, wire line communications network or a combination wire line and wireless communications network. The network 224 may also be or include the Internet or other network.

The computing device 202 may access a server 226 or other elements or components that may be part of the system 200 via the network 224. The server 226 may include a processor 228. An operating system 230 may be operable on the processor 228 to control operation of the server 226 and to perform various other functions, such as command debugging and the like.

In some embodiments of the present invention, a command debugging application 232 or similar application may be operable on the processor 230. The command debugging application 232 may be provided in some embodiments of the system 200 in lieu of command debug application 210 in the computing device 202. In other embodiments of the system 200, the command debug application 232 may function in coordination with the command debugging application 210 in the computing device 210. The command debug application 232 may perform some or most of the operations associated with command debugging similar to that described with respect to FIG. 1, particularly in communications devices that may have limited capacity to completely perform such functions.

The server 226 may also include a memory system 236. The command debugging application 232 may be stored on the memory system 236 and uploaded to the processor 228 for operation when needed or accessed.

The server 226 may also include a network interface 240 for accessing the network 224. The network interface 240 may be similar to network interface 222 in the computing device 202. The network interface 240 may also be or may include a transceiver for accessing the network 224 via a wireless, wire line or combination wireless and wire line connection.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to debug a user command that failed to execute on a computing device, the method comprising: forming a syntactically valid built-up command; comparing the user command to the built-up command to determine if the user command and the built-up command are semantically equivalent; analyzing the user command holistically; presenting at least one hypothesis of a possible correction to the user command in response to the user command and the built-up command being semantically equivalent; and receiving a copy of the user command in response to one of the user command failing to execute and a user accessing a command debug application.

2. The method of claim 1, further comprising querying the user to determine how the user command was constructed.

3. The method of claim 1, further comprising requesting each parameter and an associated parameter value for the user command.

4. The method of claim 3, further comprising providing for a user to indicate that a parameter should be omitted for each optional parameter.

5. A method of claim 3, using each parameter and the associated parameter value to form the syntactically valid built-up command.

6. The method of claim 5, further comprising:
indicating to the user that the user command is executable in response to the user command and the built-up command being identical; and
indicating to the user at least one of a current system state is preventing successful execution of the user command and at least one of the parameter values is faulty.

7. The method of claim 1, further comprising one of retrieving a history of attempted commands and requesting a copy of a last user command in response to one of a predetermined number of user commands failing to execute and a user accessing a command debug application.

8. The method of claim 1, further comprising presenting a choice of hypotheses for the user to at least one of select, edit and save a chosen hypothesis.

9. A method to debug a user command that failed to execute on a computing device, the method comprising: invoking an interactive dialogue to assist with debugging the user command; forming a syntactically valid built-up command from responses to the interactive dialogue; comparing the user command to the built-up command to determine if the user command and the built-up command are semantically equivalent; presenting at least one hypothesis of a possible correction to the user command in response to the user command and the built-up command being semantically equivalent; and receiving a copy of the user command in response to one of the user command failing to execute and a user accessing a command debug application.

10. The method of claim 9, further comprising requesting each parameter and an associated parameter value.

11. The method of claim 10, further comprising indicating any possible errors, inconsistencies and mismatches in the user command in response to the user command and the built-up command being semantically equivalent.

12. A system to debug a user command that failed to execute on a computing device, the system comprising: a processor; a command debugging application operable on the processor, wherein the command debugging application comprises: a module to form a syntactically valid built-up command; a module to compare the user command to the built-up command to determine if the user command and the built-up command are semantically equivalent; a module to analyze the user command holistically; a module to present at least one hypothesis of a possible correction to the user command in response to the user command and the built-up command being semantically equivalent; and a module to receive a copy of the user command in response to one of the user command failing to execute and a user accessing a command debug application.

13. The system of claim 12, further comprising a display to present an interactive dialogue to query the user to determine how the user command was constructed.

14. The system of claim 12, further comprising a display to present a choice of hypotheses for a user to at least one of select, edit and save a chosen hypothesis.

15. A computer readable storage medium to debug a user command that failed to execute on a computing device, the computer readable storage medium comprising: computer usable program code configured to form a syntactically valid built-up command; computer usable program code configured to compare the user command to the built-up command to determine if the user command and the built-up command are semantically equivalent; computer usable program code configured to analyze the user command holistically; computer usable program code configured to present at least one hypothesis of a possible correction to the user command in response to the user command and the built-up command being semantically equivalent; and computer usable program code configured to receive a copy of the user command in response to one of the user command failing to execute and a user accessing a command debug application.

16. The computer readable storage medium of claim 15, further comprising computer usable program code configured to present a choice of hypotheses for the user to at least one of select, edit and save a chosen hypothesis.

\* \* \* \* \*